United States Patent Office 2,763,648
Patented Sept. 18, 1956

2,763,648

CITRUS FLUORESCENT DYES

Folsom E. Drummond, Washington, D. C., assignor to Chadeloid Corporation, Dayton, Ohio, a corporation of Delaware No Drawing. Application April 13, 1954,
Serial No. 422,969

1 Claim. (Cl. 260—249.6)

This invention relates to novel fluorescent dyes derived from triazine compounds condensed with citrus flavone glycosides.

The novel fluorescent compounds of the present invention may be presented by the following general formula

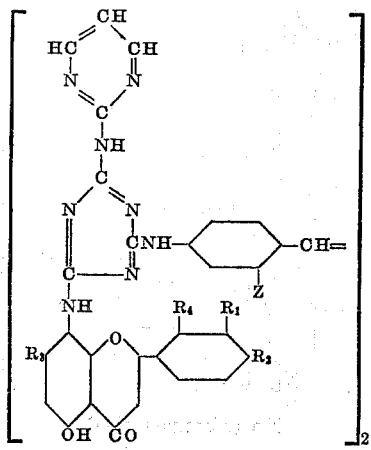

wherein $R_1$ is H or OH
$R_2$ is H, OH or $OCH_3$
$R_3$ is OH or $(C_{12}H_{21}O_9)$—O— or sugar residue—O—
$R_4$ is H or $OCH_3$ and Z represents the group COOM or $SO_3M$ in which M represents hydrogen or a cation, e. g., sodium, potassium or ammonium, alkylol amino, or alkaline earth metal such as calcium, barium, etc.

The novel compounds may be prepared by first halogenating a flavanone, for example hesperidin, hesperetin, naringenin, eriodictyol, eriodictin, citronin and the like citrus flavanone glycosides, to provide an intermediate product which is condensed with triazine. As a typical example, the halo derivative of hesperetin may be prepared by the action of chlorine or bromine on boiling hesperetin to form an intermediate having the formula:

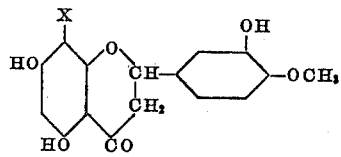

wherein X stands for chlorine or bromine.
Similarly, by the action of chlorine or bromine on boiling eriodictin the halogen derivative is formed having the formula:

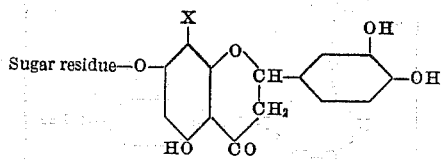

wherein X stands for chlorine or bromine.

The halogenated flavone intermediate is then condensed with diamino-stilbene sulfonic acid to produce the novel fluorescent compound in accordance with this invention.

The following examples are given to indicate how the fluorescent compounds of the invention may be prepared.

Example I

Two molar proportions of chlorinated hesperetin are mixed with one molar proportion of diamino-stilbene sulfonic triazine, the mixture being dissolved in 200 parts of water with the addition of enough sodium carbonate to give an alkaline solution. The mixture is then heated slowly to approximately 70° C. and maintained at this temperature for 7 hours, the solution being maintained at approximately pH 8 to 8.5 by the addition of sodium carbonate solution. The condensation product is isolated in the usual manner and may be generally found to have the formula thus:

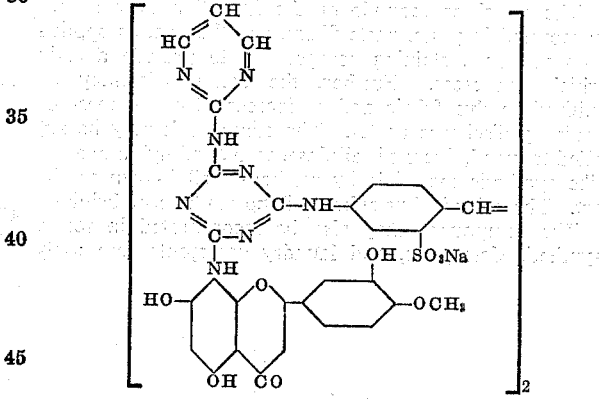

Example II

In this example chlorinated naringenin is condensed with diamino-stilbene sulfonic acid triazine compound as in Example I to produce a naringenin derivative fluorescent dye compound of the formula:

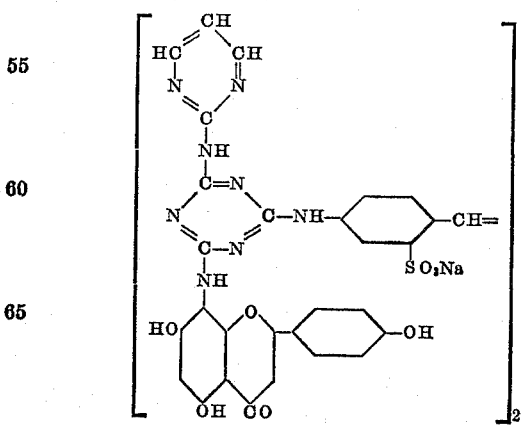

Example III

In this instance chlorinated eriodictyol is reacted with diamino-stilbene sulfonic acid triazine compound to produce the condensation product having the formula:

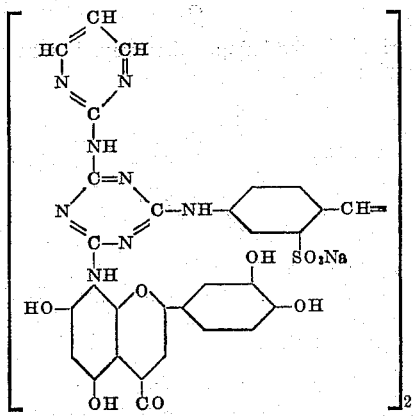

Example IV

In this example the isoflavone chlorinated derivative is condensed with the diamino-stilbene sulfonic acid triazine compound to produce an isoflavone derivative as follows: 8-chloro-3-phenol-benzogammapyrone is condensed with the diamino-stilbene sulfonic acid griazine to form the isoflavone condensation products forming fluorescent dye.

As will be understood, other flavone glycosides, as well as isoflavone glycosides may be substituted for the flavone derivatives to produce a corresponding condensation product with the diamino-stilbene sulfonic acid compound. The starting material utilized may be the products described in U. S. Patent 2,658,065.

The novel compounds of the invention may be incorporated in paste, paste fillers, and the like, as applied to wood as a staining composition to provide a stain which fluoresces. Further, the compounds may be utilized to dye fabric and to increase the whiteness of ordinary discharge pastes. The compounds may be applied to wood, fibers of cellulose, wool, and nylon and the like synthetic materials by methods well known in the art. The color is thus enhanced and made more brilliant.

The compounds may also be incorporated in soaps, synthetic detergents, and laundry detergents commonly employed to wash fabrics and the like to increase the brightness of the color and make it more brilliant.

It will also be apparent that in the foregoing examples novel compounds and products of the present invention are obtained as sodium salts, however other equivalent salts such as potassium and lithium may be substituted for sodium and produce compounds having similar properties. Further, instead of using sodium carbonate, equivalent alkaline agents for carrying out the condensations in the synthesis of the compounds may be utilized. Moreover, the alkaline earth metal salts, such as barium and calcium salts may be obtained similarly as sodium and potassium salts.

The compounds of the present invention provide fluorescent agents for use in various compositions and find particular use in the preparation of stains for wood and the like, as well as brightness in the preparation of soaps and detergents. The dyes may also be used in the preparation of paper and the like cellulosic material to improve the whiteness and brilliancy of the colors, particularly under the action of ultra-violet light.

From the foregoing it will be understood that substitutions and changes may be made in the process and constituents employed without departing from the spirit and scope of this invention, and as more particularly pointed out in the appended claim.

What is claimed is:

A compound represented by the following formula—

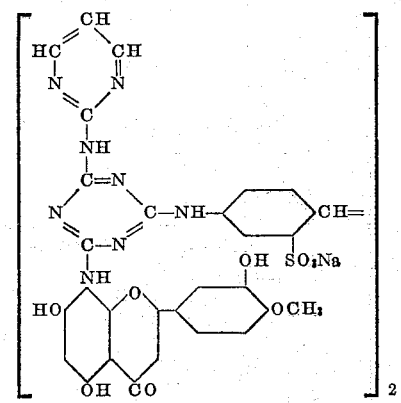

No references cited.